United States Patent
Miyao et al.

(10) Patent No.: US 10,481,398 B2
(45) Date of Patent: Nov. 19, 2019

(54) VIRTUAL IMAGE DISPLAY APPARATUS

(71) Applicant: SEIKO EPSON CORPORATION, Tokyo (JP)

(72) Inventors: Toshiaki Miyao, Matsumoto (JP); Takahiro Totani, Suwa (JP); Masayuki Takagi, Matsumoto (JP); Takashi Takeda, Suwa (JP); Akira Komatsu, Tatsuno-machi (JP); Takeshi Koshihara, Matsumoto (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 569 days.

(21) Appl. No.: 15/079,884

(22) Filed: Mar. 24, 2016

(65) Prior Publication Data

US 2016/0282623 A1    Sep. 29, 2016

(30) Foreign Application Priority Data

Mar. 25, 2015 (JP) ................................. 2015-062197

(51) Int. Cl.
| | |
|---|---|
| G02B 27/01 | (2006.01) |
| G02B 27/14 | (2006.01) |
| F21V 8/00 | (2006.01) |
| G02B 5/26 | (2006.01) |

(52) U.S. Cl.
CPC .......... *G02B 27/0172* (2013.01); *G02B 5/26* (2013.01); *G02B 6/0055* (2013.01); *G02B 27/141* (2013.01); *G02B 2027/0118* (2013.01)

(58) Field of Classification Search
CPC ............................................ G02B 27/01–0189
See application file for complete search history.

(56) References Cited

U.S. PATENT DOCUMENTS

| | | | |
|---|---|---|---|
| 2001/0027125 A1 | 10/2001 | Kiyomatsu et al. | |
| 2005/0280358 A1* | 12/2005 | Cheng .................. | G02B 5/3033 313/504 |
| 2006/0120247 A1 | 6/2006 | Noda et al. | |

(Continued)

FOREIGN PATENT DOCUMENTS

| | | |
|---|---|---|
| JP | 2001-264681 A | 9/2001 |
| JP | 2003-282235 A | 10/2003 |

(Continued)

OTHER PUBLICATIONS

Xiao Xue et al., "Light-Guide Optical Element Utilizing Notch Filters for See-Through Glasses" Beijing Institute of Technology; Beijing, China, 2004, pp. 1111-1114.

*Primary Examiner* — Bumsuk Won
*Assistant Examiner* — Jeffrey E Madonna
(74) *Attorney, Agent, or Firm* — Oliff PLC

(57) ABSTRACT

In an image generation unit, a light emitting part is formed using a self-emitting OLED device, and thereby, high-contrast images can be formed and the life of the light emitting part and the life of the virtual image display apparatus are extended. Even when the light emitted in the light emitting part has deviation in color balance, a half-mirror layer that has light transmissivity and realizes see-through vision is a reflection film having wavelength dependence, and thereby, a uniform color balance of image lights is achieved and images in good conditions are visually recognized.

15 Claims, 11 Drawing Sheets

(56) References Cited

U.S. PATENT DOCUMENTS

| | | | | |
|---|---|---|---|---|
| 2007/0070859 | A1* | 3/2007 | Hirayama | G02B 5/32 |
| | | | | 369/112.04 |
| 2008/0094586 | A1* | 4/2008 | Hirayama | G02B 6/0018 |
| | | | | 353/98 |
| 2010/0046210 | A1* | 2/2010 | Mathai | H01L 51/52 |
| | | | | 362/147 |
| 2010/0328935 | A1* | 12/2010 | Pance | F21S 10/005 |
| | | | | 362/231 |
| 2013/0250380 | A1 | 9/2013 | Fujikawa et al. | |
| 2015/0002528 | A1* | 1/2015 | Bohn | G02B 27/0172 |
| | | | | 345/589 |
| 2015/0172551 | A1 | 6/2015 | Irie | |
| 2015/0268467 | A1* | 9/2015 | Cakmakci | G03H 1/0248 |
| | | | | 359/13 |

FOREIGN PATENT DOCUMENTS

| | | |
|---|---|---|
| JP | 2006-184869 A | 7/2006 |
| JP | 2010-230771 A | 10/2010 |
| JP | 2012-168425 A | 9/2012 |
| JP | 2013-200467 A | 10/2013 |
| JP | 2015-115938 A | 6/2015 |
| WO | 2006/061927 A1 | 6/2006 |

\* cited by examiner

VIRTUAL IMAGE DISPLAY APPARATUS

BACKGROUND

1. Technical Field

The present invention relates to a virtual image display apparatus including a head mounted display that presents images formed by an image display device or the like to an observer.

2. Related Art

Various systems have been proposed as optical systems incorporated in virtual image display apparatuses including head mounted displays (hereinafter, also referred to as HMDs) attached to heads of observers. Of them, for example, for preventing generation of ghost light due to image lights, systems with characteristics in layer or film parts for adjustment and control of lights such as a system having a bonding layer for bonding a part in which a half mirror of optical components is formed contains a dye (see Patent Document 1 (JP-A-2012-168425)) and a system having a half mirror that reduces variations in reflectance with respect to incident angles of lights (see Patent Document 2 (JP-A-2010-230771)) are known.

Here, in an HMD or the like as the above described virtual image display apparatus, formation of high-quality images with high contrast, i.e., sufficiently dark in black representation parts is required as is the case of image projection by a projector or the like. For example, in a see-through HMD that allows visual recognition in superimposition of outside world light and picture light, no image is displayed in the black representation parts and the outside world is seen through. The higher the contrast (the darker the black), the clearer the field of view of the parts not displaying images, and accordingly, higher contrast is particularly desired for the panel.

In order to obtain the higher contrast of the panel, e.g. image formation by a self-emitting display device such as an OLED is considered. However, in the case of using the OLED or the like, there are problems in higher brightness and longer life. For example, if priority is given to the longer life, it may be possible that e.g. color balance (luminance balance between lights in different wavelength ranges) deviates. It is hard to use image lights with the deviated color balance and adjustment and control of lights may be required.

SUMMARY

An advantage of some aspects of the invention is to provide a virtual image display apparatus that may achieve uniform color balance of image lights in formation of high-contrast images and the longer life of the apparatus.

A first virtual image display apparatus according to an aspect of the invention includes a image generation unit that outputs image lights, and a reflection film having light transmissivity and having wavelength dependence that provides higher reflectance for a light of a predetermined wavelength range of components of the image lights from the image generation unit than reflectance for lights of the other wavelength ranges.

In the virtual image display apparatus, even in the case where e.g. an OLED or the like is used for higher contrast, the reflection film having the wavelength dependence with different reflectance depending on the wavelength range is provided in the light guide optical path of the image lights, and thereby, a uniform color balance of the image lights through the reflection film may be achieved and controlled so that images in good conditions may be visually recognized. Further, the reflection film has the light transmissivity, and thereby, in a see-through HMD that allows visual recognition of outside world light and image lights in superimposition, the reflection film can be provided in the superimposition location of the outside world light and image lights and high-contrast images are formed, and thereby, a good visual recognition condition in see-through vision may be maintained.

In a specific aspect of the invention, the image generation unit includes a self-emitting device as a light emitting part. In this case, in the image generation unit, the size and the weight may be reduced and high-contrast images can be formed.

In another specific aspect of the invention, the light emitting part includes an OLED device as the self-emitting device. In this case, particularly high-contrast images can be formed using the characteristics of the OLED.

In still another aspect of the invention, the reflection film has the wavelength dependence corresponding to deviation of color balance of the image lights output from the image generation unit. In this case, when e.g. the OLED or the like is used for the light emitting part as a light source, deviation is provided to the color balance and the longer life of the light source (light emitting part) and the longer life of the apparatus may be realized.

In still another aspect of the invention, the image generation unit outputs image lights with luminance balance in consideration of a life property of the light emitting part as a light source (i.e., a property that affects a period in which the part may function as the light source), and the reflection film has reflection characteristics inversely proportional to brightness of lights with respect to each wavelength range of the image lights output from the image generation unit as the wavelength dependence. In this case, the life of the light source may be extended and the uniform color balance of the image lights may be achieved by the reflection film while the life of the light source is extended.

In still another aspect of the invention, the reflection film has reflection characteristics that reflect a component in a wavelength range from 430 nm to 490 nm of the light in a visible wavelength range at higher reflectance by 5% to 20% than components in the other wavelength ranges. In this case, in the light emitting part, even when the component in the wavelength range from 430 nm to 490 nm corresponding to the blue wavelength range has the lower luminance than that of the components of the other wavelength ranges, that is, is relatively dark and the color balance entirely deviates, the uniform color balance of the image lights through the reflection film may be achieved using the reflection characteristics in the reflection film.

In still another aspect of the invention, the reflection film has pulsed reflection characteristics at least at respective one or more specific wavelengths from 430 nm to 490 nm, from 491 nm to 580 nm, and from 581 nm to 700 nm. In this case, in the respective colors from 430 nm to 490 nm corresponding to the blue wavelength range, from 491 nm to 580 nm corresponding to the green wavelength range, and from 581 nm to 700 nm corresponding to the red wavelength range, the components of specific wavelengths may be efficiently extracted as components of the image lights.

In still another aspect of the invention, a light guide device having a light guide member that guides image lights by reflection on an inner surface and a light transmission member that is bonded to the light guide member and allows visual recognition of outside world light and the image lights in superimposition is further provided, wherein the reflection film forms a reflection surface of the light guide member. In this case, the light guide member and the light transmission member may cooperatively achieve see-through vision.

In still another aspect of the invention, the reflection film is a semi-transmissive reflection film formed on a bonding surface on which the light guide member and the light transmission member are bonded in the light guide device. In this case, the reflection characteristics in the semi-transmissive reflection film for achieving see-through vision are adjusted, and thereby, the uniform color balance of the image lights through the reflection film may be achieved.

In still another aspect of the invention, a see-through compensation part provided outside of an optical path of the image lights nearer a side of an outside world than the reflection film and having inverse wavelength dependence to the wavelength dependence for transmitted light of the reflection film is further provided. In this case, coloring of the outside world light due to the wavelength dependence for the transmitted light of the semi-transmissive reflection film as the reflection film may be resolved (cancelled) by the see-through compensation part.

In still another aspect of the invention, a shade device attached to cover at least a part in front of an eye and having an outside light transmittance adjustment function for improving picture visibility by reducing transmittance of the outside world light is further provided, wherein the see-through compensation part is provided in the shade device. In this case, the function of resolving coloring of the outside world light due to the reflection film may be provided in the shade device.

In still another aspect of the invention, the see-through compensation part has a size equal to or larger than that of the reflection film. In this case, in the part in front of the eye, the region occupied by the reflection film is covered by the see-through compensation part, and thereby, an action for resolving coloring may be produced in advance for the entire components passing through the reflection film of the outside world light.

In still another aspect of the invention, the reflection film has higher reflectance in order of light of a blue wavelength range, light of a red wavelength range, and light of a green wavelength range with respect to the image lights from the image generation unit. In this case, good color images with balance of blue, green, and red may be formed.

In still another aspect of the invention, the reflection film includes a dielectric multilayer film. In this case, by adjustment of the thickness of the dielectric multilayer film, the reflection film having desired wavelength dependence may be formed.

In still another aspect of the invention, the reflection film is formed by stacking of a plurality of dielectric multilayer films having reflection characteristics respectively corresponding to each wavelength range. In this case, the reflection film having wavelength dependence with desired reflectance with respect to each wavelength range may be formed.

A second virtual image display apparatus according to an aspect of the invention includes a image generation unit that outputs image lights by light from a light emitting part as a light source, and a reflection film having reflectance characteristics with respect to each wavelength range in consideration of a life property of the light emitting part.

In the virtual image display apparatus, in the case where various light sources (light emitting parts) are used for forming the image lights, in consideration of the life property of the light source, the reflection film has reflectance characteristics in response thereto, and thereby, control may be made so that the uniform color balance of the image lights through the reflection film may be achieved and images in good conditions may be visually recognized while the life of the light source and the life of the apparatus are extended.

A third virtual image display apparatus according to an aspect of the invention includes a image generation unit that outputs image lights, and a reflection film having wavelength dependence that provides higher reflectance for a light of a predetermined wavelength range of components of the image lights from the image generation unit than reflectance for lights of the other wavelength ranges, and forms a mirror reflection surface at a light-incident side of a light guide member that guides the image lights from the image generation unit.

In the virtual image display apparatus, the reflection film having wavelength dependence with different reflectance depending on the wavelength range is formed on the mirror reflection surface at the light-incident side of the light guide member, and thereby, control may be made so that the uniform color balance of the image lights through the reflection film may be achieved and images in good conditions may be visually recognized.

In a specific aspect of the invention, the reflection film has light absorption characteristics proportional to brightness of lights with respect to each wavelength range of the image lights from the image generation unit. In this case, by adjustment of the light absorption characteristics, the uniform color balance of the image lights from the image generation unit may be achieved.

BRIEF DESCRIPTION OF THE DRAWINGS

The invention will be described with reference to the accompanying drawings, wherein like numbers reference like elements.

11B is a plan view for explanation of a structure of a first display apparatus of the virtual image display apparatus.

DESCRIPTION OF EXEMPLARY EMBODIMENTS

First Embodiment

As below, a virtual image display apparatus according to the first embodiment of the invention will be explained in detail with reference to FIG. 1 etc.

Figure 1:
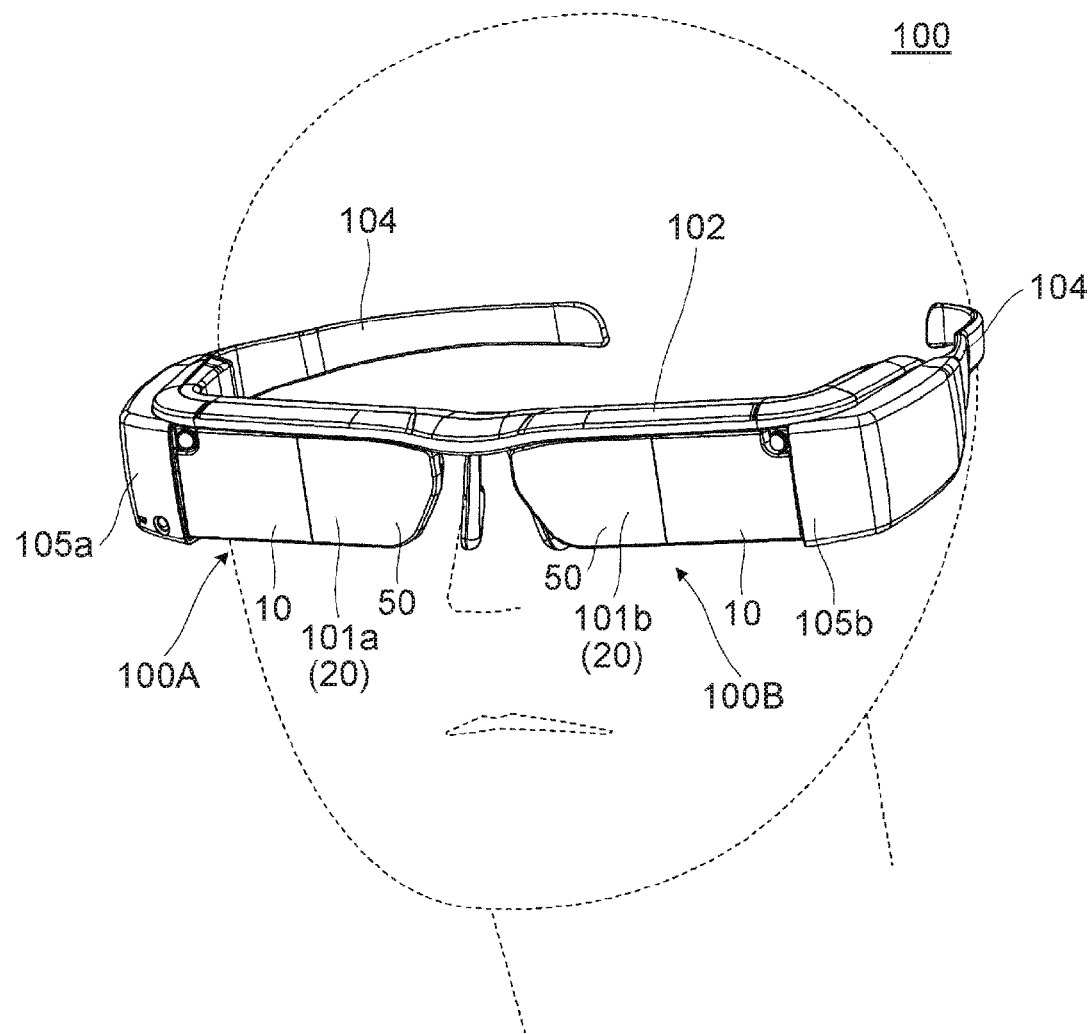
FIG. 1 is a perspective view for brief explanation of an appearance of an example of a virtual image display apparatus according to the first embodiment.
Figure 2:
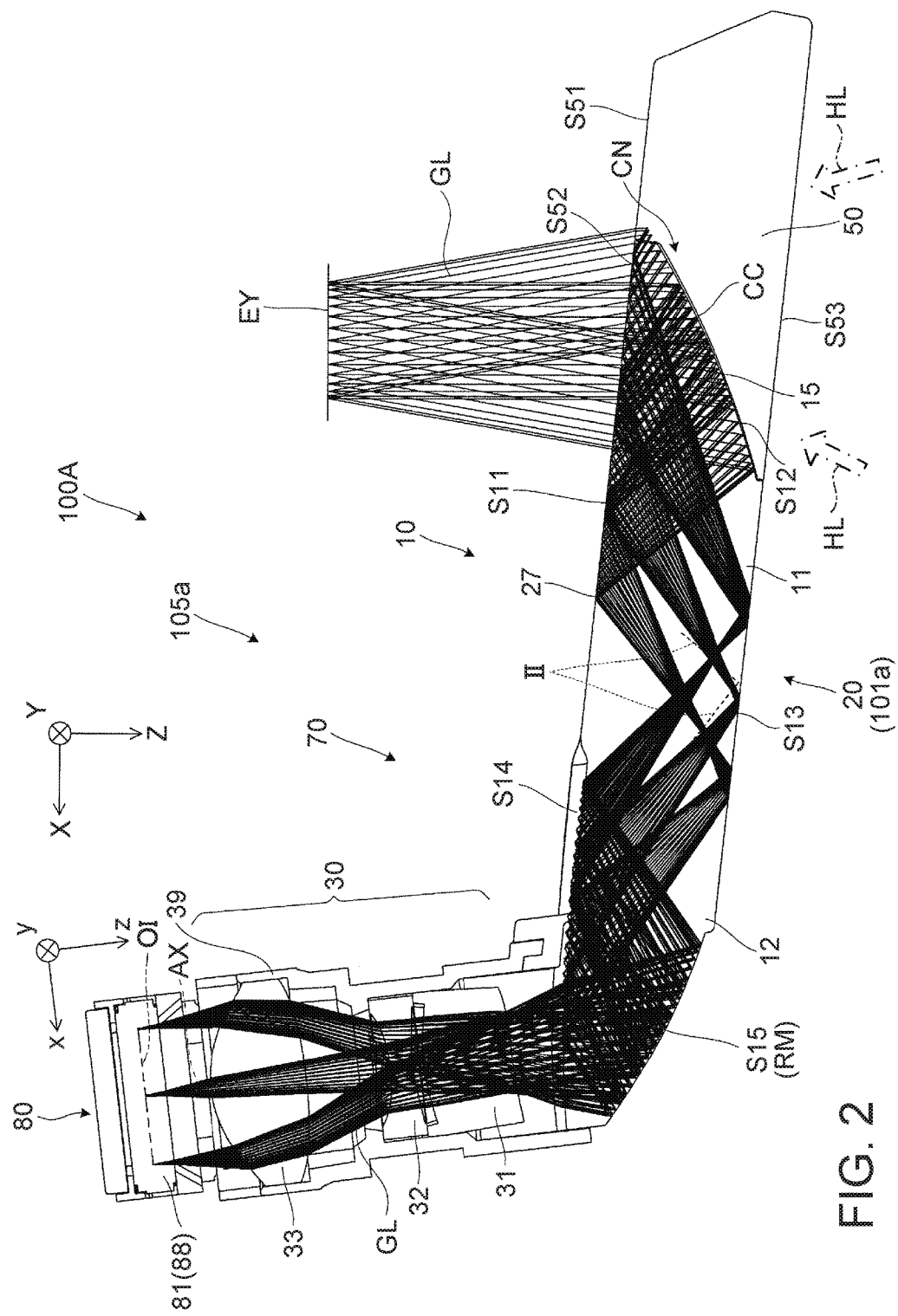
FIG. 2 is a sectional view of a main body part forming the virtual image display apparatus in a plan view.

As shown in FIGS. 1 and 2, a virtual image display apparatus 100 of the embodiment is a head mounted display having an appearance like spectacles, and a virtual image display apparatus that enables an observer or a user wearing the virtual image display apparatus 100 to visually recognize image lights (picture lights) by virtual images and visually recognize or observe an outside world image in see-through vision. The virtual image display apparatus 100 includes first and second optical members 101a, 101b for see-through covering in front of eyes of the observer, a frame part 102 that supports both of the optical members 101a, 101b, and first and second image formation main body parts 105a, 105b added to parts from both of the left and right ends of the frame part 102 to posterior temple parts (temples) 104. Here, a first display apparatus 100A as a combination of the first optical member 101a and the first image formation main body part 105a on the left in the drawing is a unit forming virtual images for right eye and functions as a virtual image display apparatus even by itself. Further, a second display apparatus 100B as a combination of the second optical member 101b and the second image formation main body part 105b on the right in the drawing is a unit forming virtual images for left eye and functions as a virtual image display apparatus even by itself. Note that, from comparison of FIG. 2 with FIG. 1, it is known that, for example, each of the first and second image formation main body parts 105a, 105b includes a projection lens 30 housed in a lens tube part 39 and an image display device 80 containing an image generation unit (picture device) 81. That is, the projection lens 30, the image display device 80 etc. shown in FIG. 2 are housed inside of each of the first and second image formation main body parts 105a, 105b shown in FIG. 1.

As shown in FIG. 2, the first display apparatus 100A may be regarded as an apparatus including a projection see-through device 70 as an optical system for projection and the image display device 80 that forms picture lights. The projection see-through device 70 has a role of projecting an image formed by the image display device 80 as a virtual image on the eye of the observer. The projection see-through device 70 includes the first optical member 101a or a light guide device 20 and the projection lens 30 for imaging. The first optical member 101a or the light guide device 20 includes a light guide member 10 for light guiding and see-through vision and a light transmission member 50 for see-through vision. Note that the first image formation main body part 105a includes the image display device 80 and the projection lens 30.

The image display device 80 includes the image generation unit (picture device) 81 that forms a panel surface OI including pixels in a matrix form by a self-emitting illumination containing a light emitting part 88 that emits OLED (organic EL) as a light source, and additionally has a drive control unit (not shown) that controls operations of the image generation unit 81 (picture device) containing the light emitting part 88 etc. Note that, though the details will be described later with reference to FIG. 3, here, in the light emitting part 88 as the self-emitting OLED device forming the image generation unit (picture device) 81, for the longer life, light having deviation in color balance is emitted as light source light.

The projection lens 30 is a projection system including three optical elements (lenses) 31 to 33 along e.g. a light-incident side optical axis (optical axis AX) as component elements, and supported by the lens tube part 39 housing these optical elements 31 to 33. Note that the lenses 31 to 33 contain non-axisymmetric curved surfaces (free-form surfaces).

As described above, the light guide device 20 includes the light guide member 10 for light guiding and see-through vision and the light transmission member 50 for see-through vision. The main body parts of the light guide member 10 and the light transmission member 50 are formed using a resin material that exhibits higher light transmissivity in the visible range, e.g., cycloolefin polymer or the like, and respectively molded by e.g. injection and solidification of a thermoplastic resin in a die. As described above, the light guide member 10 is a part of the prism-shaped light guide device 20 and an integrated member, however, may be considered as a division into a first light guide part 11 at the light-exiting side and a second light guide part 12 at the light-incident side. The light transmission member 50 is a member that assists the see-through function of the light guide member 10 (auxiliary optical block) and integrally fixed to the light guide member 10 into one light guide device 20. Note that, of the light guide device 20 having the above described configuration, the end portion located at the light source side (base side) is fitted in the end portion of the lens tube part 39, and thereby, the light guide device is accurately positioned and fixed to the projection lens 30.

As below, the structure of the light guide device 20 etc. will be explained in detail in view of optical functions. As described above, the light guide device 20 includes the light guide member 10 and the light transmission member 50. Of them, the light guide member 10 linearly extends in a part at the center side near the nose (in front of the eye) in the plan view. Of the light guide member 10, the first light guide part 11 provided at the center side near the nose, i.e., the light-exiting side has a first surface S11, a second surface S12, and a third surface S13 as side surfaces having optical functions and the second light guide part 12 provided at the periphery side apart from the nose, i.e., the light-incident side has a fourth surface S14 and a fifth surface S15 as side surfaces having optical functions. Of them, the first surface S11 and the fourth surface 14 are continuously adjacent and the third surface S13 and the fifth surface S15 are continuously adjacent. Further, the second surface S12 is provided between the first surface S11 and the third surface S13, and the fourth surface 14 and the fifth surface S15 are adjacent at a large angle. Furthermore, here, the first surface S11 and the third surface S13 in the opposed arrangement have planar shapes nearly in parallel to each other. On the other hand, the other surfaces having the optical functions, i.e., the second surface S12, the fourth surface S14, and the fifth surface S15 are non-axisymmetric curved surfaces (free-form surfaces).

Here, of the respective surfaces forming the light guide device 20, the second surface S12 has a half-mirror layer 15. The half-mirror layer 15 is a reflection film having light transmissivity formed by deposition of a dielectric multilayer film having a multilayer structure in which dielectric materials having different refractive indices are alternately stacked in specific thicknesses (i.e., semi-transmissive reflection film), and the reflectance with respect to picture lights is adjusted in view of facilitation of observation of outside world light in see-through vision. Though the details will be described later, in the invention, particularly, in addition to the semi-transmissive reflection configuration for see-through vision, the layer has wavelength dependence in consideration of the life property of the self-emitting light emitting part 88 forming the image display device 80 (i.e., the property that affects the period in which the part can function as the light source). Further, the fifth surface S15 is formed by deposition of a light reflection film RM formed by an inorganic material or the like and functions as a mirror reflection surface.

Further, in the light guide device 20, the light guide member 10 is joined to the light transmission member 50 by bonding via a bonding layer CC, and a part including the joint surfaces of the light guide member 10 and the light transmission member 50 and the bonding layer CC is referred to as "joint part CN". That is, the half-mirror layer 15 on the second surface S12 is formed in the joint part CN.

The light transmission member 50 has a first transmissive surface S51, a second transmissive surface S52, and a third transmissive surface S53 as side surfaces having optical functions. Here, the second transmissive surface S52 is provided between the first transmissive surface S51 and the third transmissive surface S53. The first transmissive surface S51 is on a surface as an extension of the first surface S11 of the light guide member 10, and the second transmissive surface S52 is a curved surface joined to and integrated with the second surface S12 by the bonding layer CC, and the third transmissive surface S53 is on a surface as an extension of the third surface S13 of the light guide member 10. Of them, the second transmissive surface S52 and the second surface S12 of the light guide member 10 are integrated by joining via the thin bonding layer CC and have shapes with nearly the same curvatures.

Note that the light guide device 20 is formed by joining of base materials to be light guide member 10 and the light transmission member 50 in the joint part CN and coating of the joined base materials by dip treatment. That is, a hard coat layer 27 of the light guide member 10 is provided on the entire light guide device 20 with the light transmission member 50.

As below, an example of optical paths of picture lights etc. will be explained. The picture lights GL output from the image display device 80 pass through the projection lens 30 and are converged, and enter the fourth surface S14 provided in the light guide member 10 of light guide device 20. The picture lights GL that have passed through the fourth surface S14 are converged and travel, are reflected by the fifth surface S15, and enter the fourth surface S14 from inside again and are reflected. The picture lights GL reflected by the fourth surface S14 enter the third surface S13 and are totally reflected, and enter the first surface S11 and are totally reflected. Here, the picture lights GL form an intermediate image in the light guide member 10 before or after passing through the third surface S13. The image plane II of the intermediate image corresponds to the image plane of the image generation unit 81. The picture lights GL totally reflected by the first surface S11 enter the second surface S12, and particularly, the picture lights GL entering the half-mirror layer 15 provided on the second surface S12 are partially reflected by the half-mirror layer 15 while partially being transmitted through the mirror, and enter and pass through the first surface S11 again. The picture lights GL that have passed through the first surface S11 enter the pupil of the eye of the observer or an equal position thereof as nearly parallel pencils of rays. That is, the observer observes the image as a virtual image formed on the image generation unit (picture device) 81 by the picture lights.

On the other hand, regarding the outside world light, almost no aberration or the like is generated and the observer observes an outside world image without distortion because the third surface S13 and the first surface S11 are nearly in parallel to each other and the third transmissive surface S53 as the extension of the third surface S13 and the first transmissive surface S51 as the extension of the first surface S11 exist. As described above, the light guide device 20 forms a see-through optical system that superimposes picture lights and outside world light.

As described above, in the embodiment, within the light guide member 10, the picture lights from the image generation unit 81 are guided by five reflections from the first surface S11 to the fifth surface S15 including at least two total reflections. Thereby, both display of the picture lights GL and see-through vision of visual recognition of outside world light HL can be achieved and aberration of the picture lights GL can be corrected.

As described above, the light emitting part 88 is formed by the self-emitting OLED device, and thereby, the higher contrast image formation can be performed. On the other hand, for the longer life, luminance is adjusted with respect to each color, i.e., with respect to each wavelength range. That is, in the light emitting part 88, light with the luminance balance in response to the life property is emitted and deviation is generated in the color balance. In contrast, in the embodiment, the half-mirror layer 15 has reflection characteristics inversely proportional to the brightness of lights with respect to each wavelength range in consideration of the life property in the light emitting part 88 as wavelength dependence to deal with the color balance of the light source light, and thereby, the uniform color balance is achieved in the image lights GL through the half-mirror layer 15.

Figure 3:
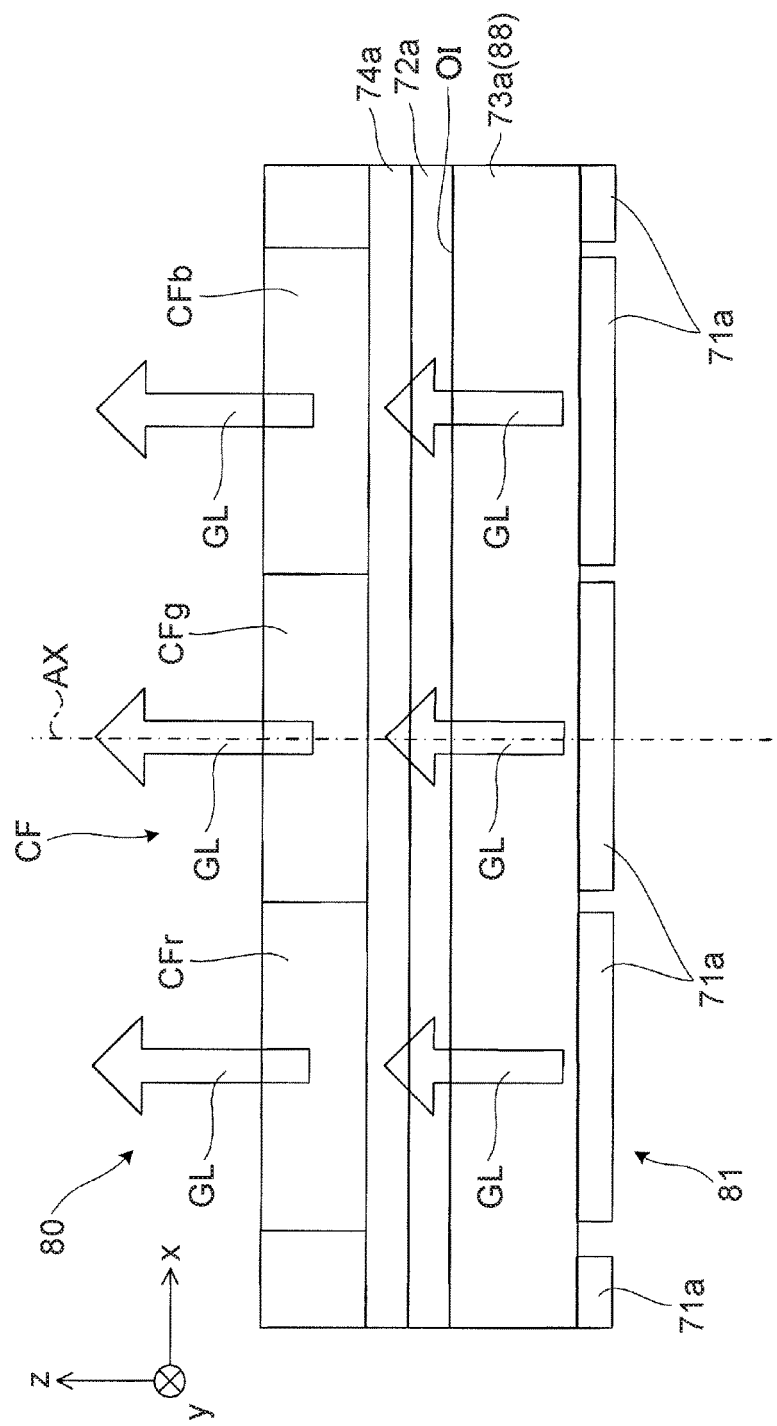
FIG. 3 is a conceptual diagram showing one configuration example of an image display device.

As below, referring to FIG. 3, regarding the image display device 80 of the virtual image display apparatus 100, a more specific example of the optical configuration will be explained in detail.

First, as described above, the image display device 80 is the self-emitting image display device having the image generation unit 81 and additionally has a color filter layer CF provided at the immediate downstream of the image generation unit 81 and the drive control unit (not shown) that controls the operation of the image generation unit 81. The image generation unit 81 of the image display device 80 includes a plurality of transparent electrodes (anodes) 71a as pixel electrodes, a counter electrode (cathode) 72a, an OLED layer 73a as a light emitting function layer provided between the transparent electrodes 71a and the counter electrode 72a and functioning as the light emitting part 88, and a protective layer 74a. The color filter layer CF is formed on the protective layer 74a. The color filter layer CF includes red, green and blue color filter parts CFr, CFg, CFb, and the color filter parts CFr, CFg, CFb for the respective colors are arranged in a matrix form respectively corresponding to the plurality of transparent electrodes (anodes) 71a as pixel electrodes. According to the configuration, the image display device 80 allows the OLED layer 73a to emit light by appropriately operating the electrodes 71a, 72a, and thereby, the image generation unit 81 outputs picture lights GL from the panel surface OI. That is, the image display device 80 has the OLED layer 73a containing the OLED device as a light source and emits the picture lights GL with respect to each pixel forming the panel surface OI. Further, the lights emitted by the image generation unit 81 as the picture lights GL pass through the color filter layer CF, and thereby, colored picture lights (image lights) GL are output from the image display device 80. Here, in the embodiment, in the OLED layer 73*a* functioning as the light emitting part 88, amounts of currents are adjusted with respect to each color light, and thereby, light with luminance balance according to the life property is emitted. Accordingly, the light source light emitted from the light emitting part 88 has deviation in color balance as a whole.

Generally, the OLED device is a current-injection device and has a life property that the life is shorter in inverse proportion to the cube of current density. Accordingly, for the longer life, increase in the light emission area or reduction in the amount of current is required. However, for example, when the amount of current is suppressed, the luminance is lower. Here, for example, increase in reflectance of the half-mirror layer 15 is considered for dealing with the luminance reduction of the OLED device, however, if the reflectance is evenly increased, the transmittance of the outside world light is lower in response thereto and it is harder to obtain good see-through characteristics. Particularly, regarding the ratio of lifetimes with respect to each color pixels if the current density when the OLED device is used is set to be constant, the OLED device having the life property that, for example, suppose that the ratio of the G (green) pixel is "1", relatively, the R (red) pixel is about 0.8 and the B (blue) pixel is about 0.5 is assumed. That is, generally, it is known that, when the current density is set to be constant, the life of the G (green) pixel is the longest and the life of the B (blue) pixel is the shortest. Accordingly, in the embodiment, when the OLED device is used as the light source, for example, regarding the components of the visible light wavelength range (e.g. the wavelength range from 430 nm to 700 nm), the amount of current of the component of the wavelength range from 430 nm to 490 nm corresponding to the blue wavelength range for which the life particularly tends to be shorter is set to be smaller than that of the components of other wavelength ranges, and thereby, luminance is adjusted in response to the life property of the light source. In this case, for example, the luminance of B (blue) pixel is reduced in a range from 5% to 20% and the so-called color balance is deviated as the light source, and thereby, while the life of the light emitting part 88 is optimized, the luminance can be suppressed to the degree that the luminance is not too low and adjustment of the uniform color balance is possible at the reflection film side. On the other hand, in the embodiment, as described above, when the picture lights GL are guided by the reflection in the light guide device 20, the half-mirror layer 15 forming the semi-transmissive reflection film has wavelength dependence corresponding to the deviation of the color balance in the light emitting part 88, that is, the half-mirror layer has reflection characteristics that reflect the component in the wavelength range from 430 nm to 490 nm with the higher reflectance than that of the components of the other wavelength ranges (is the reflection film having the wavelength dependence), and thereby, the uniform color balance of the picture lights GL finally reaching the observer is achieved.

Figure 4A:
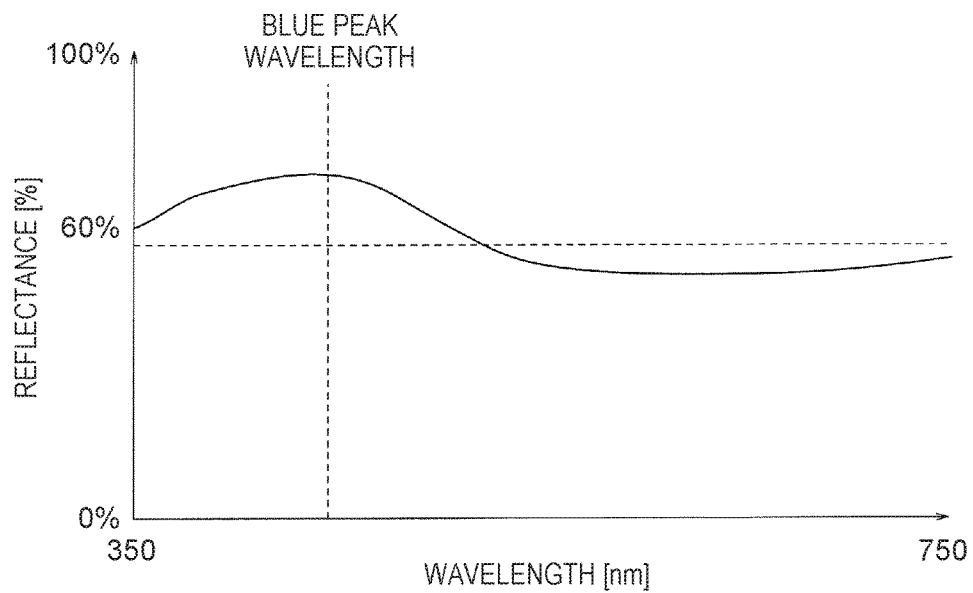
FIG. 4A is a graph showing reflection characteristics of a reflection film.
Figure 4B:
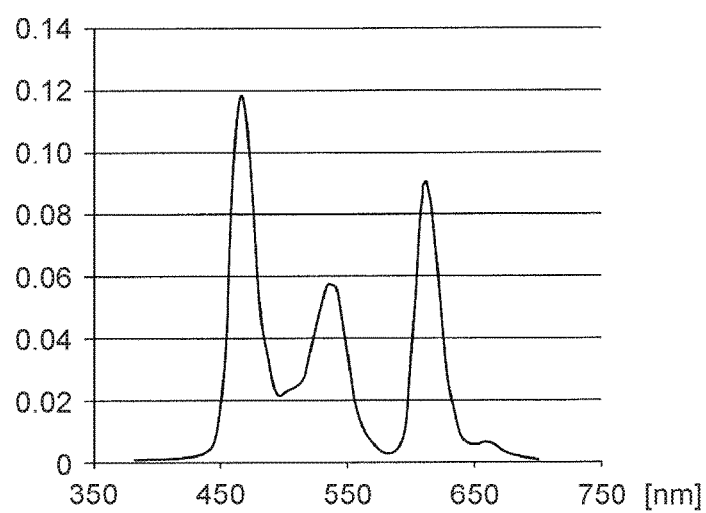
FIG. 4B is a graph showing a spectrum in a light emitting part.

As below, the relationship between the characteristics of the half-mirror layer 15 as the semi-transmissive reflection film that functions as the reflection film having wavelength dependence and the light emitting part 88 in the embodiment will be explained with reference to FIGS. 4A and 4B. FIG. 4A is a graph showing reflection characteristics of the reflection film having the wavelength dependence, i.e., the half-mirror layer 15, and the horizontal axis indicates wavelength [nm] and the vertical axis indicates reflection rate (%) with respect to light intensity [W/sr·m2·nm]. On the other hand, FIG. 4B is a graph showing a spectrum of the light source light in the light emitting part 88 of the image generation unit 81 as the picture device having the light emitting part 88. As shown in FIG. 4A, the half-mirror layer 15 in the embodiment has the highest peak reflectance in the wavelength range from 430 nm to 490 nm corresponding to the blue wavelength range, and the reflectance is equal to or more than 60% on average. On the other hand, in the other visible wavelength ranges than the wavelength range (i.e., 491 nm to 700 nm corresponding to the green and red wavelength ranges), the reflectance is suppressed to be equal to or more than 60% on average. Further, the average of the blue wavelength range (from 430 nm to 490 nm) has reflection characteristics that reflect at the higher reflectance by 5% to 20% than the averages of the other wavelength ranges. That is, the half-mirror layer 15 is adjusted to have reflection characteristics inversely proportional to the brightness of lights with respect to each wavelength in consideration of the life property in the light emitting part 88. Note that, as an example shown in FIG. 4B, in the image generation unit 81 as the picture device, the wavelength range from 430 nm to 490 nm corresponding to the blue wavelength range, the wavelength range from 491 nm to 580 nm corresponding to the green wavelength range, and the wavelength range from 581 nm to 700 nm corresponding to the red wavelength range respectively have peaks, and the wavelength at the highest peak reflectance in FIG. 4A corresponds to the peak position of the wavelength range from 430 nm to 490 nm in FIG. 4B. Further, regarding the green wavelength range and the red wavelength range, the reflectance of the red wavelength range is higher than the reflectance of the green wavelength range. That is, in the half-mirror layer 15, the reflectance is higher in the order for the light of the blue wavelength range, the light of the red wavelength range, and the light of the green wavelength range.

In the above description, the reflectance in the wavelength range from 430 nm to 490 nm corresponding to the blue wavelength range is set to be higher by 5% or more than the reflectance in the other wavelength ranges. Thereby, even in the case where the light source light such as the light of the light emitting part 88 is used, the minimum required luminance of the component in the blue wavelength range can be secured. On the other hand, the degree of increase in reflectance with respect to the other wavelength ranges is suppressed to 20% or less, that is, an upper limit is set to the reflectance of the component of the blue wavelength range in the half-mirror layer 15 and certain transmissivity is maintained, and thereby, for example, of the components of outside world light to be transmitted through the half-mirror layer 15, the extreme drop of the transmittance of the component of the blue wavelength range and colored appearance of the outside world light can be avoided.

As described above, in the virtual image display apparatus 100 according to the embodiment, in the image generation unit 81 as the picture device, the light emitting part 88 is formed by the self-emitting OLED device, and thereby, high-contrast images can be formed and the life of the light emitting part 88 and the life of the virtual image display apparatus 100 may be extended. In this case, even when the light emitted in the light emitting part 88 has deviation in color balance, the half-mirror layer 15 functions as the reflection film having wavelength dependence, and thereby, the uniform color balance of the picture images GL may be achieved and images in good conditions may be visually recognized. Further, in the above described case, the virtual image display apparatus 100 is the see-through HMD that allows visual recognition of the outside world light HL and the picture images GL in superimposition, and, in this case, the transmittance of the outside world light HL and the reflectance of the picture lights GL are appropriately balanced by the half-mirror layer 15 forming the semi-transmissive reflection film, and thereby, good see-through visual recognition conditions may be maintained.

Second Embodiment

Hereinafter, a virtual image display apparatus according to the second embodiment will be explained. Note that the embodiment is a modified example of the virtual image display apparatus of the first embodiment and the same as the first embodiment except the structure of the reflection film having wavelength dependence, and the overall illustration and explanation will be omitted.

Figure 5:
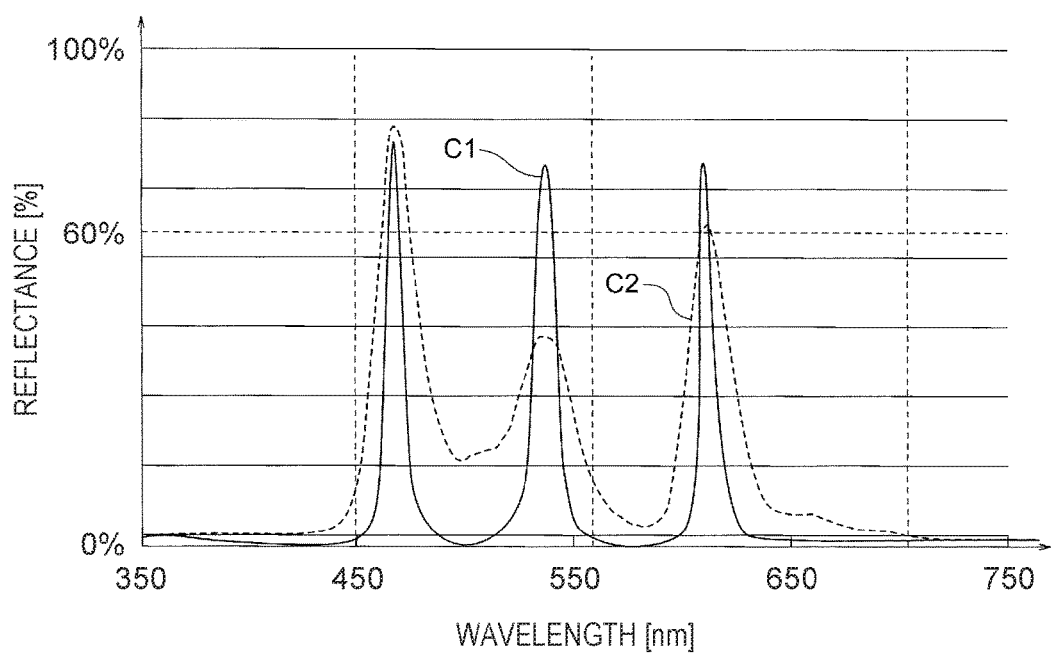
FIG. 5 is a graph showing a relationship between reflection characteristics of a reflection film and a spectrum in a light emitting part in a virtual image display apparatus according to the second embodiment.

FIG. 5 is a graph showing a relationship between reflection characteristics of the reflection film having wavelength dependence, i.e., the half-mirror layer 15 (see FIG. 2) and a spectrum of light source light in the picture device having the light emitting part in the virtual image display apparatus according to the embodiment. Note that, in the graph, a curve C1 shows the reflection characteristics of the half-mirror layer 15 and a curve C2 shows the spectrum of the light source light in the picture device. Note that, in the virtual image display apparatus according to the embodiment, the configuration of the light emitting part is the same as the configuration of the light emitting part of the first embodiment, and the curve C2 is the same as the curve shown in FIG. 4B. As illustrated, in the embodiment, the curve C1 has pulsed reflection characteristics at one specific wavelength in each of the wavelength range from 430 nm to 490 nm corresponding to the blue wavelength range, the wavelength range from 491 nm to 580 nm corresponding to the green wavelength range, and the wavelength range from 581 nm to 700 nm corresponding to the red wavelength range, and particularly, have the pulsed reflection characteristics corresponding to the peak wavelengths of the respective colors shown by the curve C2. Further, in the curve C1, regarding the reflectance having pulsed peaks at the three specific wavelengths respectively corresponding to blue, green and red, the reflectance of the blue specific wavelength is higher by 5% to 20% than the reflectance of the other color specific wavelengths. Thereby, the uniform color balance is achieved. On the other hand, as shown by the curve C1, regarding the ranges of the other wavelengths than the specific wavelengths exhibiting the pulsed reflection characteristics, the reflectance is 10% or less and the reflectance is higher.

In the case of the embodiment, the wavelength range with the higher transmittance of the half-mirror layer 15 is set to be wider, and thereby, the better see-through characteristics may be obtained. Further, regarding the light emitting part 88, as is the case of the first embodiment, its life may be improved. Furthermore, in this case, regarding the reflection of the light having the specific wavelength in the half-mirror layer 15, even when the reflectance is set to be higher, the see-through characteristics are harder to be lost, and light use efficiency of picture lights may be designed to be higher.

Third Embodiment

As below, a virtual image display apparatus according to the third embodiment will be explained. The virtual image display apparatus according to the embodiment is different from the cases of the respective embodiments in that a see-through compensation part is further provided in the respective configurations exemplified as the respective embodiments. Note that the embodiment is a modified example of the virtual image display apparatus of the first embodiment and the structure except the see-through compensation part is the same as that of the first embodiment, and the overall illustration and explanation will be omitted.

Figure 6:
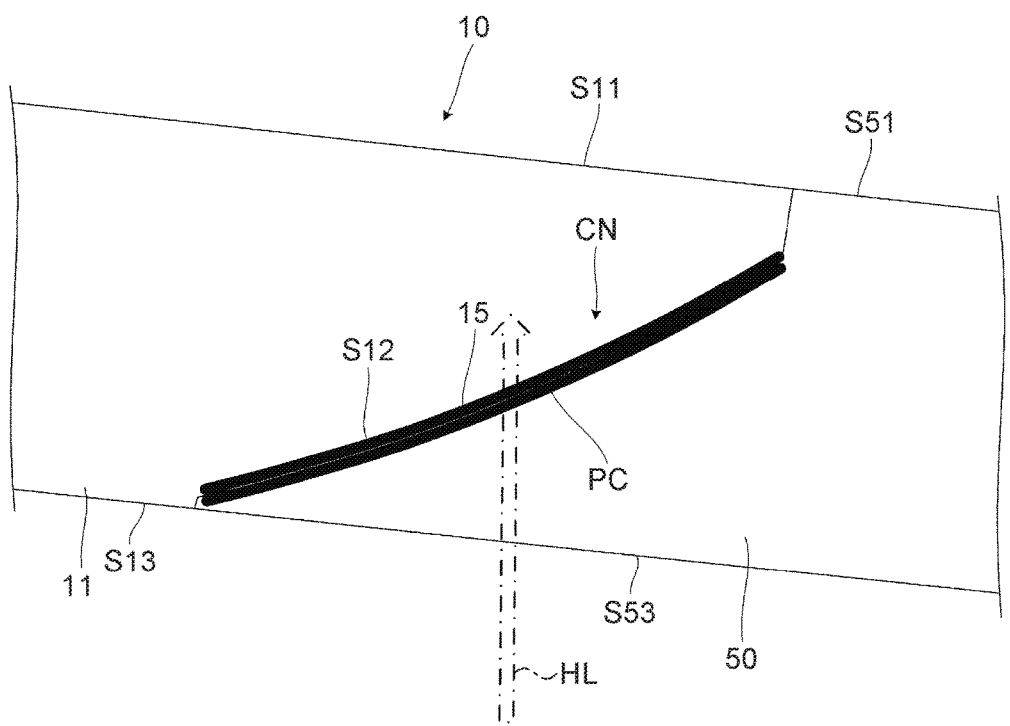
FIG. 6 is a partially enlarged view for explanation of a virtual image display apparatus according to the third embodiment.

FIG. 6 is a diagram for explanation of one configuration example of a see-through compensation part PC in the virtual image display apparatus according to the embodiment and a partially enlarged view conceptually showing the half-mirror layer 15 as the reflection film having wavelength dependence and a state around. As illustrated, the see-through compensation part PC is provided to overlap with the outer side of the light guide region of the picture lights with respect to the half-mirror layer 15 in the joint part CN. Further, the see-through compensation part PC includes e.g. a dielectric multilayer film or the like, and has inverse wavelength dependence to the wavelength dependence for the transmitted light of the half-mirror layer 15.

Also, in the embodiment, the half-mirror layer 15 has reflection characteristics with the higher reflectance for lights of the specific wavelength range than that of the other wavelength ranges as wavelength dependence. From another point of view, regarding the transmission characteristics, i.e., light transmittance of the wavelength dependence of the half-mirror layer 15, generally, it is considered that the transmittance for the light in the specific wavelength range tends to be lower than that of the other wavelength ranges. In this case, depending on the transmission characteristics of the half-mirror layer 15, regarding the outside world light HL as light to be transmitted, if the transmittance is largely different with respect to each color light, the outside world light appears with color. On the other hand, in the embodiment, the see-through compensation part PC having the inverse wavelength dependence to the wavelength dependence of the half-mirror layer 15 for the transmitted light is provided outside of the optical path of the picture lights closer to the outside world than the half-mirror layer 15, and thereby, coloring of the outside world light due to the wavelength dependence may be dissolved (cancelled). That is, the see-through compensation part PC has higher transmissivity with respect to the light in the blue wavelength range than the lights in the other wavelength ranges. Thereby, the outside world light HL that has passed through the see-through compensation part PC is transmitted through the half-mirror layer 15 with the blue component stronger than the other color component than usual, and thereby, the lower transmissivity for the blue component than that for the other components in the half-mirror layer 15 is cancelled, and the uniform color balance of the outside world light HL as transmitted light may be achieved.

Figure 7:
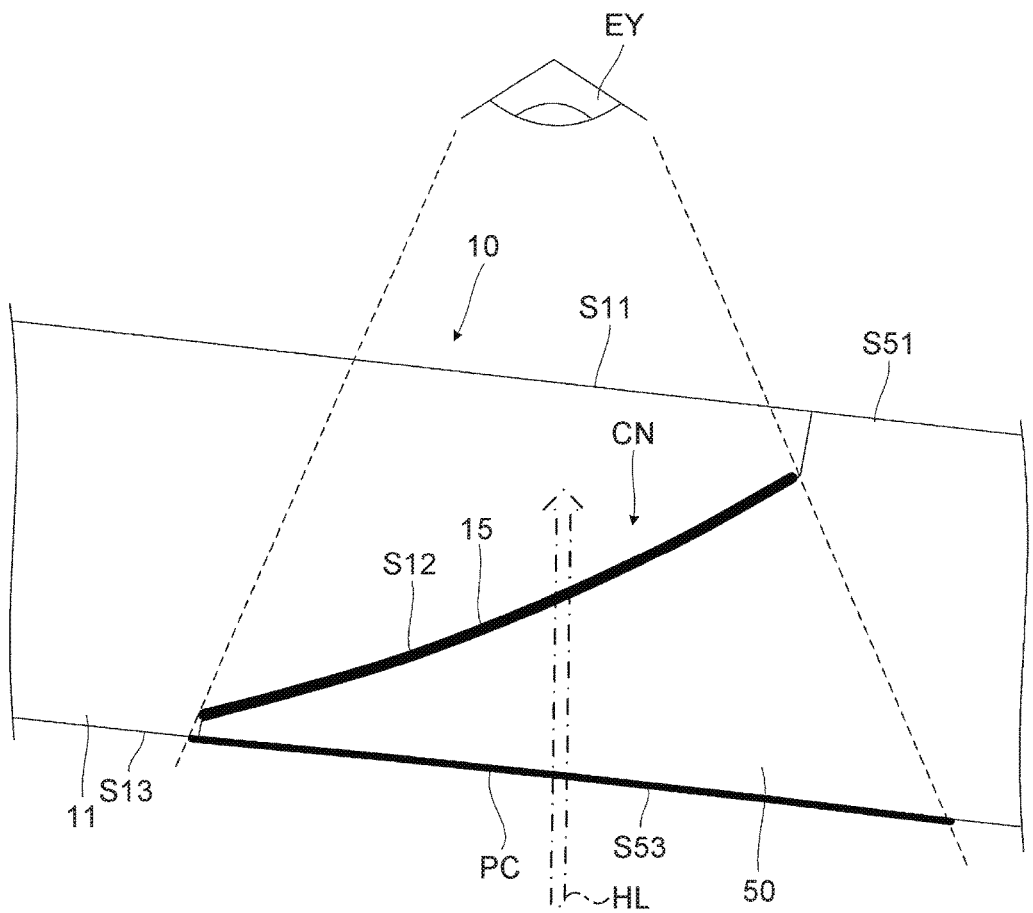
FIG. 7 is a partially enlarged view for explanation of one modified example of the virtual image display apparatus.

FIG. 7 is a partially enlarged view for explanation of one modified example of the virtual image display apparatus of the embodiment, i.e., one modified example of placement of the see-through compensation part PC. In the example of FIG. 6, the see-through compensation part PC is provided in the joint part CN, not limited to that. As shown in FIG. 7, the see-through compensation part PC may be provided in a region from the third surface S13 of the light guide member 10 to the third transmission surface S53 of the light transmission member 50 or a nearby region, i.e., in a range corresponding to the half-mirror layer 15 of the region at the outer surface side of the light guide device 20.

Note that, as shown in FIGS. 6 and 7, the see-through compensation part PC has a size equal to or larger than that of the half-mirror layer 15, and thereby, coloring of the entire components passing through the region of the half-mirror layer 15 of the outside world light HL may be resolved.

Figure 8:
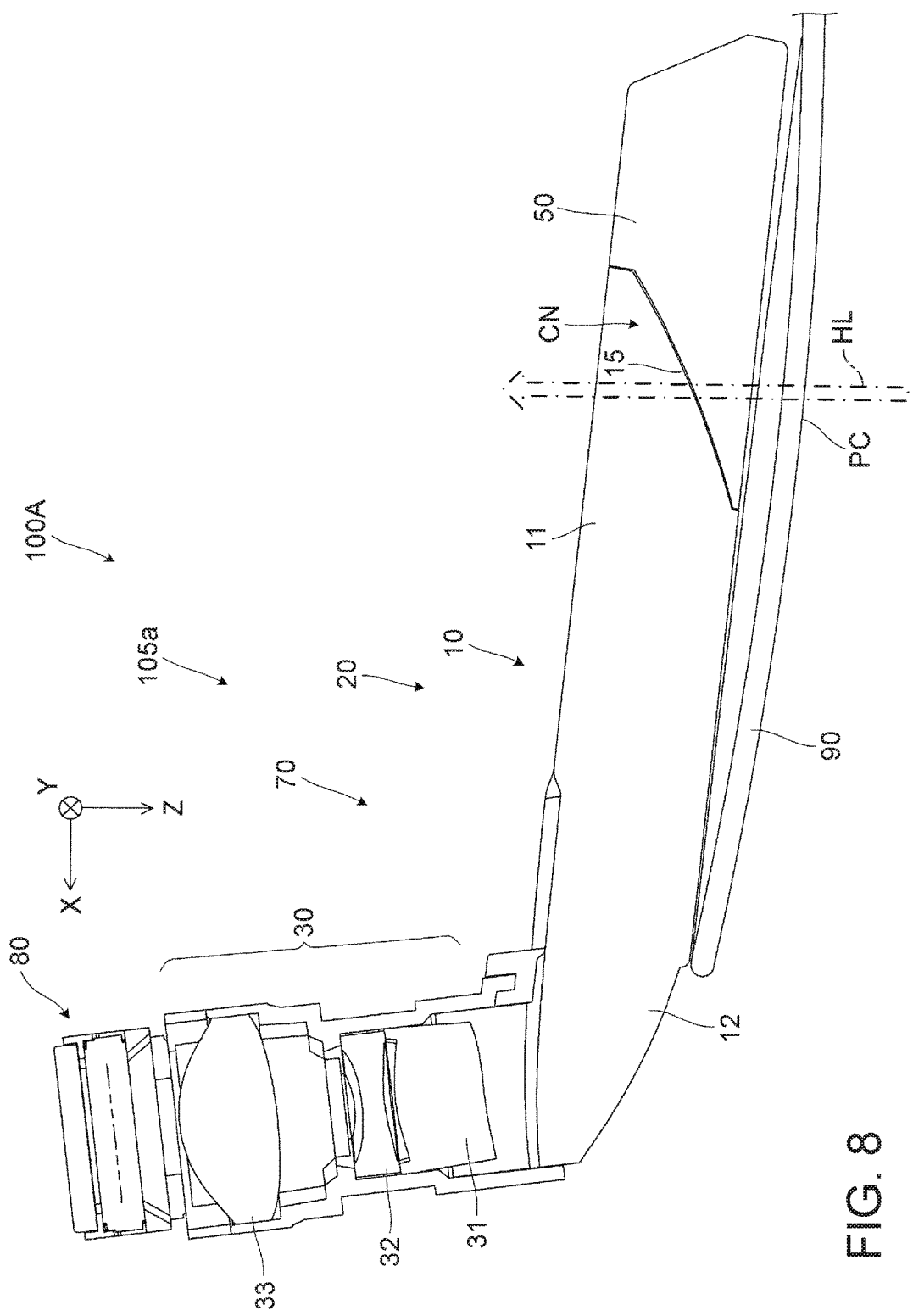
FIG. 8 is a partially enlarged view for explanation of another modified example of the virtual image display apparatus.

FIG. 8 is a partially enlarged view for explanation of another modified example of the virtual image display apparatus of the embodiment, i.e., another modified example of placement of the see-through compensation part PC. In the illustrated example, in the virtual image display apparatus, a shade device 90 as a flexible member formed using a resin material having a light shielding property or light absorption property, attached to cover the part in front of the eye of the virtual image display apparatus to reduce the transmittance of outside world light, and having an outside light transmittance adjustment function for improving picture visibility is further provided. In the shade device 90, the see-through compensation part PC may be provided. In this case, in the shade device 90, a function of resolving coloring of the outside world light HL due to transmissivity of the half-mirror layer 15 may be provided.

Further, in the embodiment, according to the amount of light reduced by passage of the region in which the half-mirror layer 15 as the reflection film and the see-through compensation part PC overlap, for example, in the form shown in FIGS. 7, 8, or the like, a light reduction filter that reduces the outside world light HL or the like as an outside world light adjustment part may be provided in a region not affecting light guide of picture lights around the see-through compensation part PC provided in the part in front of the eye of the virtual image display apparatus. By the outside world light adjustment part, no large difference in luminance may be generated between the outside world light HL passing through the half-mirror layer 15 and the see-through compensation part PC and visually recognized and the outside world light HL passing through the other regions and visually recognized.

Others

Figure 9:
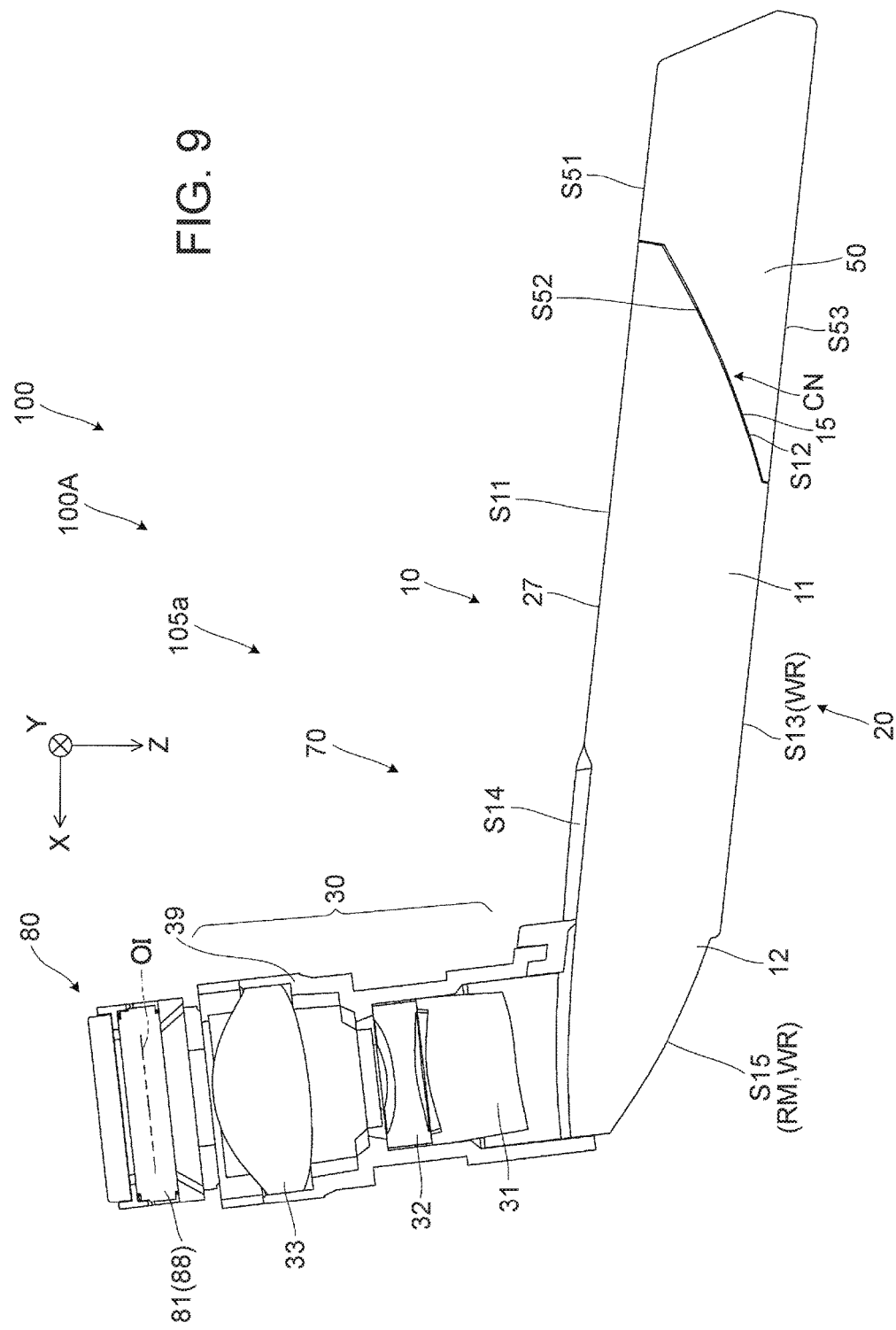
FIG. 9 is a plan view for explanation of a modified example of a location in which the reflection film is provided.

As above, the invention is explained according to the respective embodiments. However, the invention is not limited to the above described embodiments, but may be implemented in various forms without departing from the scope thereof. For example, in the respective embodiments, the half-mirror layer 15 as the semi-transmissive reflection film is the reflection film having wavelength dependence that controls (adjusts) the picture lights GL in response to the characteristics of light emitted by the light emitting part 88, and the reflection film having the wavelength dependence may be formed by another reflection surface than the half-mirror layer 15 in the virtual image display apparatus 100. Of the respective surfaces of the optical members shown in FIG. 9, e.g., a light reflection film RM formed as a mirror reflection surface on the fifth surface S15 as a surface at the light-incident side of the light guide member 10 may be a reflection film WR having the wavelength dependence. In this case, the light reflection film RM has light absorption characteristics proportional to the brightness of light with respect to each wavelength range of the light emitted by the light emitting part 88, and thereby, desired reflection characteristics may be obtained. Or, of the respective surfaces of the optical members shown in FIG. 9, e.g. the third surface S13 may be formed as the reflection film WR having the wavelength dependence. Or, including the case where the half-mirror layer 15 is the reflection film WR having the wavelength dependence, a plurality of surfaces of these surfaces may cooperatively act as the reflection film WR having the wavelength dependence. Further, wavelength dependence may be provided to the light guide member 10 itself or inside of the light guide member 10. Namely, a material that makes the reflectivity of blue light higher than that of the other colors may be used as the material for the light guide member 10.

Regarding the configuration of the reflection film of the half-mirror layer 15 or the like, the reflection film may be formed by a plurality of dielectric multilayer films in which low-, middle-, high-refractive-index materials are stacked, and thereby, the ratio of the respective layers may be adjusted and, for example, a configuration in which a metal reflection film is sandwiched by two dielectric multilayer films may be employed. In this case, wavelength dependence for desired reflectance and transmittance of the wavelength ranges of the respective colors may be easily provided using interference action or the like, and further, desired angle dependence that is harder to be realized by a single layer may be easily provided. For example, the reflection film has angle dependence that, when the incident angle is larger beyond the incident angle range of the picture lights, the reflectance increases, and thereby, generation of ghost light due to unintended light may be suppressed. As the metal reflection film, an Ag film, an Al film, or the like may be applied. When the metal reflection film is e.g. the Ag film, the absorption is smaller, and the loss by the half-mirror layer 15 may be suppressed and the efficiency may be improved. Further, the Ag film has lower sensitivity of transmittance to increase and decrease of the thickness than that of the Al film or the like, and thereby, the reflectance and the transmittance of the half-mirror layer 15 are easily adjusted. The high-refractive-index material forming the dielectric multilayer film includes a light-transmissive material such as $SiO_2$ or MgF. The middle-refractive-index material includes a light-transmissive material such as $TiO_2$, $Ta_2O_5$, or $ZrO_2$. The low-refractive-index material includes a light-transmissive material such as $Al_2O_3$. The lower and upper dielectric multilayer films sandwiching the metal reflection film are formed by stacking of several or more transparent dielectric layers formed using the above described materials and a plurality of kinds of refractive-index materials are stacked by evaporation, and thereby, incident-angle dependence or the like may be provided to the reflectance and the transmittance by an interference action.

Figure 10:
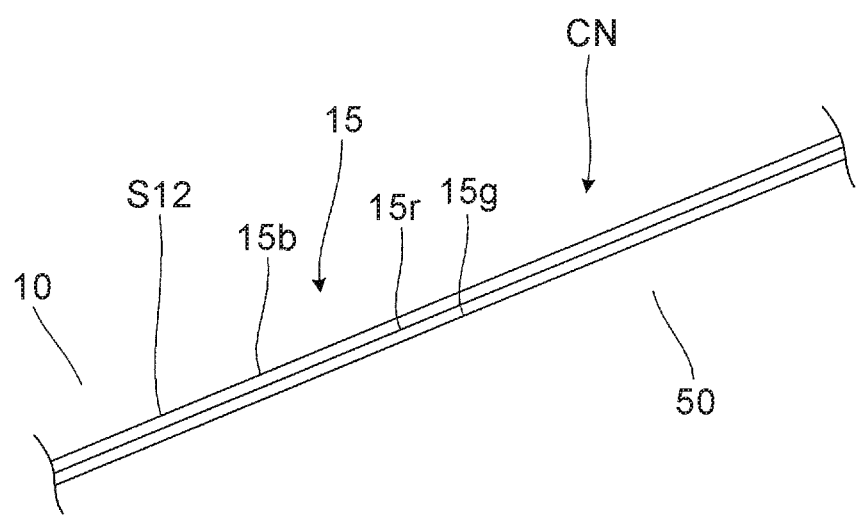
FIG. 10 is a partially enlarged view for explanation of one modified example of the structure of the reflection film.

FIG. 10 shows one modified example of the half-mirror layer 15 as the reflection film having the wavelength dependence. Here, as illustrated, the half-mirror layer 15 is formed by superimposition of three dielectric multilayer films having reflection characteristics respectively corresponding to each wavelength range. That is, the half-mirror layer 15 includes a first dielectric multilayer film 15b that reflects only the component of the blue wavelength range at specific reflectance and transmits the other lights, a second dielectric multilayer film 15r that reflects only the component of the red wavelength range at specific reflectance and transmits the other lights, and a third dielectric multilayer film 15g that reflects only the component of the green wavelength range at specific reflectance and transmits the other lights of the lights of the visible light wavelength range by the interference operation. As illustrated, of the three dielectric multilayer films 15b, 15r, 15g, the first dielectric multilayer film 15b is provided at the side closest to the light guide member 10 that guides the picture lights GL, then the second dielectric multilayer film 15r is provided, and the third dielectric multilayer film 15g is provided at the farthest side. Further, the reflectance of the respective dielectric multilayer films 15b, 15r, 15g is higher in the order. In this case, the respective color lights may be transmitted and reflected at desired reflectance by the design of the respective dielectric multilayer films 15b, 15r, 15g. For example, formation of the respective dielectric multilayer films 15b, 15r, 15g using the pluralities of dielectric multilayer films in which the above described low-, middle-, high-refractive-index materials are stacked is considered. That is, by adjustment of the ratios (thicknesses) of the low-, middle-, high-refractive-index materials for use according to the required characteristics for the respective dielectric multilayer films 15b, 15r, 15g or the like, the first to third dielectric multilayer films 15b, 15r, 15g achieving an intended purpose may be formed.

In the above described first embodiment, the image display device 80 including, but not limited to the system using the OLED layer 73a as the white light source and the color filter CF is explained as one example. For example, organic molecules that respectively emit lights in the respective colors of red, green, and blue may be prepared and sequentially arranged to form sub-pixels. In this case, for example, a configuration with reduced luminance of blue pixels compared to the luminance of red and green pixels is considered.

In the above description, the image display device 80 including, but not limited to one example in which the light emitting part is formed by the OLED device is shown. Various light sources including various types of organic EL, inorganic EL, LED arrays may be used as the light emitting part.

In the above description, the reflectance characteristics with respect to each wavelength in consideration of the life property include, but are not limited to the higher reflectance of the blue wavelength range. The reflection film may have wavelength dependence that reflectance of the components of the other wavelength ranges than the blue wavelength range is higher than the reflectance of the components of the other wavelength ranges in consideration of the life property.

In the above description, the reflectance characteristics include, but are not limited to wavelength dependence (reflectance characteristics) that reflectance differences are provided with 60% of average reflectance as one of references. The average reflectance may be defined in e.g. a range from 10% to 50%, and differences may be provided to reflectance with respect to each wavelength range of the respective colors for the defined average reflectance.

In the above description, the intermediate image corresponding to the display image of the image generation unit 81 is formed inside of the light guide member 10, however, the invention may be applied to a virtual image display apparatus that provides see-through vision without formation of the intermediate image.

In the above description, regarding the projection lens, a non-axisymmetric aspheric surface may be applied to one or more surfaces.

In the above description, the half-mirror layer (semi-transmissive reflection film) 15 is formed in the lateral rectangular region, however, the contour of the half-mirror layer 15 may be appropriately changed according to the application or other specifications.

In the above description, the virtual image display apparatus 100 having the pair of display apparatuses 100A, 100B is explained, however, only a single display apparatus may be employed. That is, one pair of the projection see-through device 70 and the image display device 80 are not provided for each of the right eye and the left eye, but the projection see-through device 70 and the image display device 80 may be provided only for one of the right eye and the left eye and the image may be seen with one eye.

In the above description, the half-mirror layer 15 is simply the semi-transmissive film (dielectric multilayer film), however, the half-mirror layer 15 may be replaced by a planar or curved hologram element.

In the above description, the light guide member 10 etc. extend in the lateral direction in which the eyes EY are aligned, however, the light guide member 10 may be provided to extend in the longitudinal direction. In this case, the light guide member 10 has a parallel-arrangement structure, not the series-arrangement structure.

In the illustrated example, the light guide device 20 has the single semi-transmissive reflection surface as the half-mirror layer 15, however, the semi-transmissive reflection surface may be divided into pieces and formed.

In the above description, only the superimposition of the image light and the outside world light is explained, however, the invention may be applied to e.g. a virtual image display apparatus by which only image light without superimposition and only outside world light may be switched and observed. Or, the invention may be applied to e.g. a virtual image display apparatus by which only image light is visually recognized, but the outside world light is not observed.

Figure 11A:
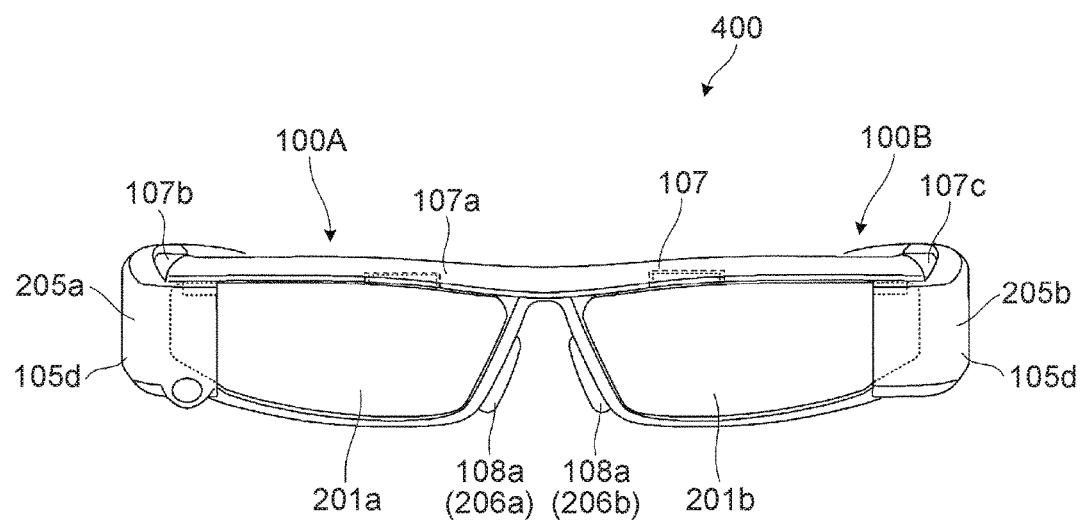
FIG. 11A is a front view for explanation of one modified example of the virtual image display apparatus, and FIG.
Figure 11B:
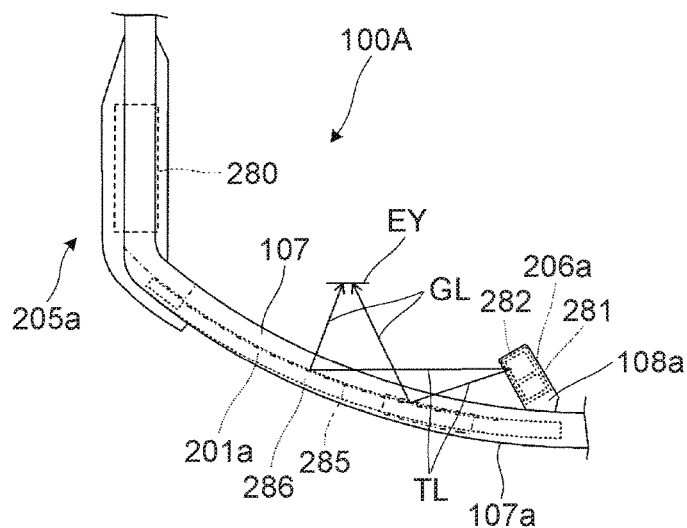

In the above description, image lights (picture lights) modulated using the self-emitting panel are allowed to enter the semi-transmissive reflection surface, however, for example, as shown in FIGS. 11A and 11B, image lights (picture lights) may be allowed to enter the semi-transmissive reflection surface using MEMS.

As below, one example of the virtual image display apparatus will be explained with reference to FIGS. 11A and 11B. A virtual image display apparatus 400 as shown in the drawings includes first and second optical members 201a, 201b for see-through covering in front of eyes of the observer, a frame 107 that supports both of the optical members 201a, 201b, first and second drive parts 205a, 205b fixed to the parts from the left and right ends to the posteriors of the frame 107, first and second picture devices 206a, 206b that output signal lights for two-dimensionally scanning. A first display apparatus 100A as a combination of the first optical member 201a, the first drive part 205a, and the first picture device 206a on the left in the drawing is a unit that forms virtual images for right eye and functions as a virtual image display apparatus even by itself. Further, a second display apparatus 100B as a combination of the second optical member 201b, the second drive part 205b, and the second picture device 206b on the right in the drawing is a unit that forms virtual images for left eye and is only a horizontal reversal of the first display device 100A, and has the same function as that of the first display device 100A.

In the first display device 100A, the first picture device 206a forms intensity-modulated signal lights and outputs the signal lights as scanning lights TL. The first optical member 201a is an irradiated member that forms picture lights GL by reflecting the scanning lights TL from the first picture device 206a, and has a function of guiding the picture lights GL to the eye EY. The first drive part 205a has a main body part 280 including a light source that supplies illumination light to the first picture device 206a via an optical fiber (not shown) or the like, a control circuit of their operations, etc.

The first picture device 206a is incorporated with a nose pad member 108a and indirectly fixed to the frame 107. The first picture device 206a has a signal light modulation part 281 that modulates the illumination light based on the control signal from the main body part 280 and a scan optical system 282 that outputs and scans with the signal lights through the signal light modulation part 281. Here, the scan optical system 282 is formed using an MEMS mirror and changes its position in synchronization with modulation of the signal lights by the signal light modulation part 281 and the optical paths of the signal lights are adjusted, and thereby, two-dimensional scan of changing the output angles of the beams toward the inner surface of the first optical member 201*a* longitudinally and laterally is performed.

The first optical member 201*a* is provided to cover the front of the eye EY of the observer in the anterior or the light output direction of the first picture device 206*a*. The first optical member 201*a* has a semi-transmissive reflection film 285 as a semi-transmissive film irradiated with the scan light, and a support member 286 that supports and fixes the semi-transmissive reflection film 285. Thereby, not only the virtual image but also the light from the outside world enters the eye EY of the observer, and the virtual image display apparatus 400 has a see-through configuration that enables observation in superimposition of them. Note that the semi-transmissive reflection film 285 may be a half-mirror or a refracting optical element of hologram or the like.

Even in the virtual image display apparatus 400 having the above described configuration, the semi-transmissive reflection film 285 has the wavelength dependence, and the intended purpose may be achieved.

In the above description, the specific explanation is made with the virtual image display apparatus as the HMD, however, the virtual image display apparatus may be altered to an HUD (head-up display).

The entire disclosure of Japanese Patent Application No. 2015-062197, filed Mar. 25, 2015 is expressly incorporated by reference herein.

What is claimed is:

1. A virtual image display apparatus comprising:
    an image generator that outputs image light, including:
        a first emitter emits a first light with a wavelength of 430 nm to 490 nm;
        a second emitter that emits a second light with a wavelength of 491 nm to 580 nm, a luminance of the second light being higher than a luminance of the first light; and
        a third emitter that emits a third light with a wavelength of 581 nm to 700 nm, a luminance of the third light being higher than the luminance of the first light; and
    a reflection film having light transmissivity and having wavelength dependence such that:
        a reflectance of the first light is higher than a reflectance of the second light; and
        the reflectance of the first light is higher than a reflectance of the third light.

2. The virtual image display apparatus according to claim 1, wherein at least one of the first, second, and third emitters is a self-emitting device.

3. The virtual image display apparatus according to claim 2, wherein the self-emitting device is an OLED device.

4. The virtual image display apparatus according to claim 1, wherein the reflectance of the first light is 5% to 20% higher than at least one of the reflectance of the second light and the reflectance of the third light.

5. The virtual image display apparatus according to claim 1, wherein the reflection film has pulsed reflection characteristics for at least one of the first light, the second light, and the third light.

6. The virtual image display apparatus according to claim 1, further comprising:
    a light guide device having:
        a light guide that guides image light by reflection on an inner surface; and
        a light transmitter that is bonded to the light guide and allows visual recognition of outside world light and the image light in superimposition,
    wherein the reflection film forms a reflection surface of the light guide.

7. The virtual image display apparatus according to claim 6, wherein the reflection film is a semi-transmissive reflection film formed on a bonding surface on which the light guide and the light transmitter are bonded in the light guide device.

8. The virtual image display apparatus according to claim 6, further comprising a see-through compensation part having inverse wavelength dependence to the wavelength dependence for transmitted light of the reflection film, provided outside of an optical path of the image light closer to a side of an outside world than the reflection film.

9. The virtual image display apparatus according to claim 8, further comprising:
    a shade device attached to cover at least a part in front of an eye and having an outside light transmittance adjustment function for improving picture visibility by reducing transmittance of the outside world light,
    wherein the see-through compensation part is provided in the shade device.

10. The virtual image display apparatus according to claim 8, wherein the see-through compensation part has a size equal to or larger than that of the reflection film.

11. The virtual image display apparatus according to claim 1, wherein the reflection film has higher reflectance in order of light of a blue wavelength range, light of a red wavelength range, and light of a green wavelength range with respect to the image light from the image generator.

12. The virtual image display apparatus according to claim 1, wherein the reflection film includes a dielectric multilayer film.

13. The virtual image display apparatus according to claim 12, wherein the reflection film is formed by stacking a plurality of dielectric multilayer films having reflection characteristics respectively corresponding to each of the first, second, and third light.

14. A virtual image display apparatus comprising:
    an image generator that outputs image light, including:
        a first emitter emits a first light with a wavelength of 430 nm to 490 nm;
        a second emitter that emits a second light with a wavelength of 491 nm to 580 nm, a luminance of the second light being higher than a luminance of the first light; and
        a third emitter that emits a third light with a wavelength of 581 nm to 700 nm, a luminance of the third light being higher than the luminance of the first light; and
    a reflection film having wavelength dependence and forming a mirror reflection surface at a light-incident side of a light guide that guides the image light from the image generator, the reflection film having wavelength dependence such that:
        a reflectance of the first light is higher than a reflectance of the second light; and
        the reflectance of the first light is higher than a reflectance of the third light.

15. The virtual image display apparatus according to claim 14, wherein the reflection film has light absorption characteristics proportional to brightness of light with respect to each of the first, second, and third light.

* * * * *